United States Patent
Omiya

(10) Patent No.: US 6,498,903 B2
(45) Date of Patent: Dec. 24, 2002

(54) ZOOM FINDER DEVICE

(75) Inventor: Akio Omiya, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/004,171

(22) Filed: Dec. 6, 2001

(65) Prior Publication Data

US 2002/0071674 A1 Jun. 13, 2002

(30) Foreign Application Priority Data

Dec. 11, 2000 (JP) .......................... 2000-375540

(51) Int. Cl.[7] .................. G03B 13/10; G03B 17/04; G03B 15/06; G03B 15/02
(52) U.S. Cl. .................. 396/379; 396/349; 396/175; 396/61
(58) Field of Search .................. 396/61, 62, 175, 396/349, 379, 383

(56) References Cited

U.S. PATENT DOCUMENTS

| 5,083,146 A | * | 1/1992 | Ueda .................. 396/379 |
| 5,708,867 A | | 1/1998 | Nagata et al. |
| 5,774,748 A | | 6/1998 | Ito et al. |
| 5,864,719 A | | 1/1999 | Hirohata |
| 6,088,538 A | * | 7/2000 | Nakamura .................. 396/379 |

FOREIGN PATENT DOCUMENTS

| JP | 09-211554 | 8/1997 |
| JP | 11-231199 | 8/1999 |

* cited by examiner

*Primary Examiner*—Russell Adams
*Assistant Examiner*—Andrew Sever
(74) *Attorney, Agent, or Firm*—Arnold International; Bruce Y. Arnold

(57) ABSTRACT

A driving gear is rotated in cooperation with zooming of a taking lens. The driving gear and a cam cylinder are attached to an axis that is supported by a finder frame. A projection of the driving gear is inserted into a cutout of the cam cylinder. Since the projection contacts with an edge of the cut out on zooming the taking lens, the rotation of the driving gear is transmitted to the cam cylinder. The cam cylinder moves a finder zoom system to change finder magnification. When the driving gear makes a reverse rotation for absorbing the backlash of the taking lens or focusing, the driving gear makes an idle rotation only for the space between the cutout and the projection. The finder magnification is unchanged while the driving gear is idly rotating. On screwing an adjustment screw of the finder frame, the cylindrical cam 36 moves towards an axial direction. The finder visibility is adjusted as zoom lenses 33, 34 move together.

13 Claims, 5 Drawing Sheets

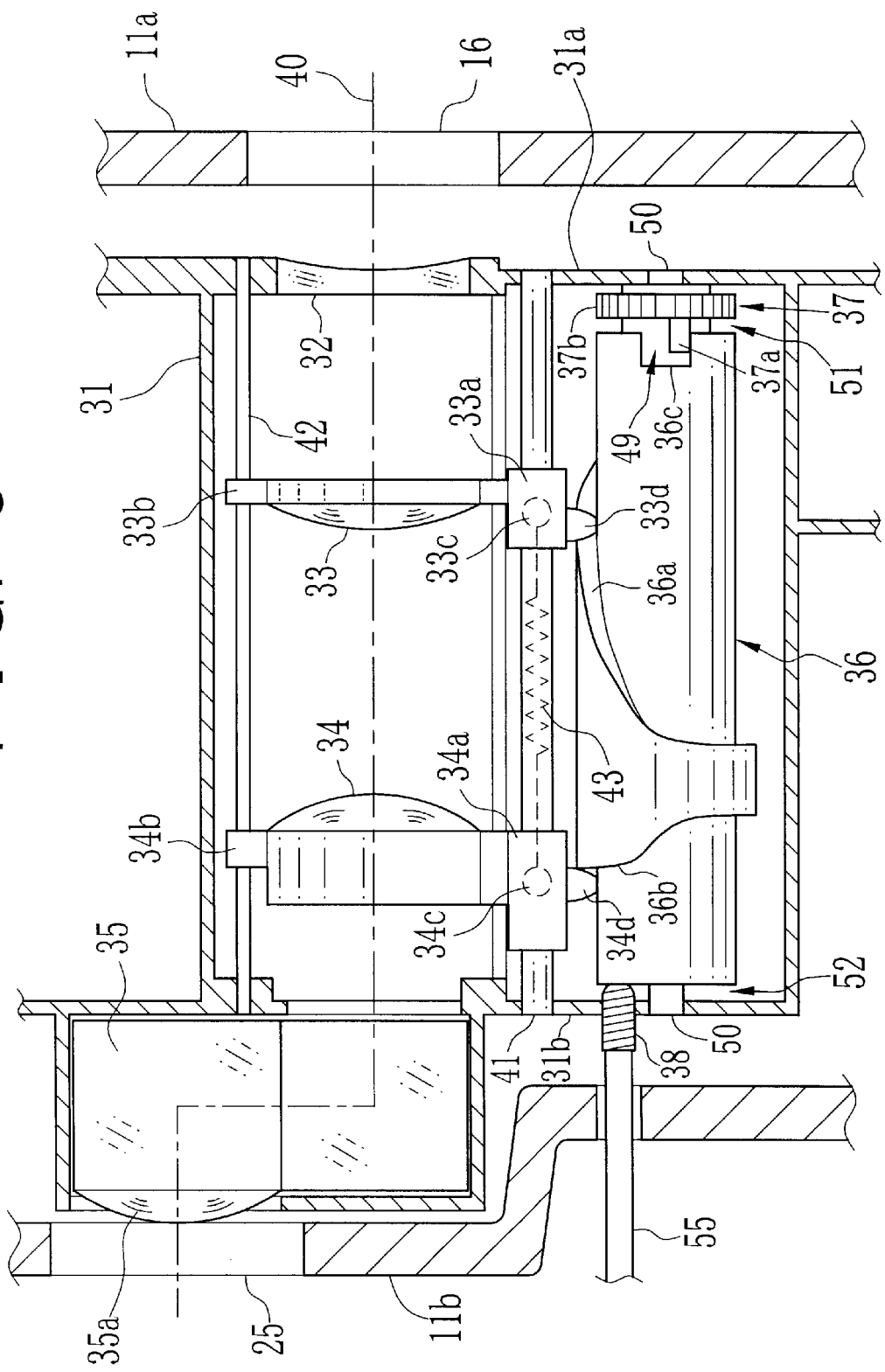

ZOOM FINDER DEVICE

BACKGROUND OF THE INVENTION

1. Field of the Invention

The present invention relates to a zoom finder device, for changing a finder magnification in cooperation with zooming of a taking lens.

2. Background Arts

A zoom compact camera adopts a zoom finder device, using a zoom lens as a taking lens. The zoom finder device varies finder magnification in cooperation with a zooming of the taking lens. In a recent zoom compact camera, it is widely used a zoom finder device of real image system that contains a finder optical system in compact. According to the zoom finder device of real image system, a subject image is focused on an image plane in the finder optical system as an aerial image, which is magnified to observe through an eyepiece lens. For instance, as disclosed in Japanese Patent Laid-open Publication No. 9-211556, the finder magnification is changed by use of a cam, which moves in cooperation with zooming of the taking lens, to move the finder zoom lens disposed in front of the imaging plane.

It is necessary to adjust the focus of an eyepiece lens on the image plane of aerial image to facilitate a finder image to observe. If proper adjustment is not performed, it is extremely hard to observe the aerial image depending on a photographer's vision. Standard visibility adjustment is performed upon manufacture. For adjustment visibility, the eyepiece lens is moved to an optical axis direction, to coincide the focus of the eyepiece lens with the aerial image plane.

As disclosed in Japanese Patent Laid-open Publication No. 11-231199, many recent compact cameras use a step zoom system that sets a zooming position of the taking lens stepwise. The step zoom system puts a focusing section between two zooming sections, to conduct zooming and focusing alternately while a movable lens barrel is rotating successively. The step zoom system can perform zooming and focusing by a single lens motor. Furthermore, there is a way for keeping the taking zoom lens in contact with one side of a cam groove so as to position the taking zoom lens in a right position, without an influence of backlash of gear and cam. On setting the movable lens barrel at a desired zooming position, it stops the movable lens barrel while moving from a predetermined direction at any time, regardless of either zooming towards a telephoto end or a wide-angle end. In other words, according to the camera that the lens motor makes a forwarding rotation to zoom from the wide-angle end to the telephoto end to stop, on zooming from the telephoto end to the wide-angle end, the lens motor makes a reverse rotation to move the movable lens barrel a little over the predetermined zooming position, then rotates the lens motor forward for the surplus to stop the movable lens barrel at the predetermined zooming position.

As a surplus space is more and more scarce around the eyepiece lens with the progress of compact of a camera, visibility adjustment by moving the eyepiece lens is becoming hard. For instance, in case the eyepiece lens and an erect prism are integrally formed by plastic so as to compact the zoom finder device, the erect prism must be moved for visibility adjustment. This not only prevents the zoom finder device from realizing compactness, but also complicates structure.

Since the finder magnification is changed in accordance with the drive of the lens motor, the step zoom system also moves the finder lens in spite of the drive of the lens motor for focusing. It is not preferable for causing a change of finder magnification. Furthermore, on keeping the taking zoom lens in contact with one side of the cam, it causes a change of finder magnification during the offset. And making use of the offset stroke for focusing of the taking lens also changes the finder magnification.

SUMMARY OF THE INVENTION

A main object of the present invention is to provide a zoom finder device that can adjust visibility without making a finder optical system complicated.

Another object of the present invention is to provide a zoom finder device, for adjustment visibility with an eyepiece lens fixed.

Further object of the present invention is to provide a zoom finder device whose finder magnification is unchanged while focusing a taking lens or offsetting a taking zoom lens.

To attain the above objects and the other objects, according to the zoom finder device of the present invention, a cam cylinder which changes finder magnification is slidable in an axial direction. By adjusting the position of the cam cylinder in the axial direction, the visibility adjustment of the finder optical system is conducted. A driving gear makes a rotation in cooperation with zooming of the taking lens. The rotation of the driving gear is transmitted to the cam cylinder through a transmission mechanism, and in cooperation with zooming of the taking lens the finder magnification is changed. The transmission mechanism has an idle section that the driving gear gets disconnected with the cam cylinder. When the driving gear is switched its rotational direction for focusing or keep one-sided, the finder magnification is unchanged on account of the idle section.

According to the preferred embodiment of the present invention, it is provided with a compression coiled spring and an adjustment screw. The compression coiled spring is stored in a hollow part of the cam cylinder, for urging the cam cylinder in a direction to separate from the driving gear. And the adjustment screw, which is threaded into the finder frame to support the cam cylinder rotatably, receives the edge of the cam cylinder whose tip is biased by the compression coiled spring. The position of the cam cylinder in the optical axis direction is adjusted by the insertion amount of the adjustment screw. Furthermore, a cutout and a projection are formed in the cam cylinder and the driving gear. The region where the projection moves within the cutout becomes the idle section.

According to the present invention, visibility of the finder optical system can be adjusted without making the finder optical system complicated and with the eyepiece lens fixed, by moving the cam cylinder in an axial direction. Visibility of the finder optical system is easily adjusted by changing the insertion amount of the adjustment screw. In addition to that, since the idle section is formed in the transmission mechanism that transmits zooming movement to the cam cylinder, the finder magnification is not changed during focusing or the offset of the step zoom.

BRIEF DESCRIPTION OF THE DRAWINGS

The above objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 5 is a schematic view illustrating another embodiment of a zoom finder device.

DETAILED DESCRIPTION OF THE PREFERRED EMBODIMENTS

Figure 1:
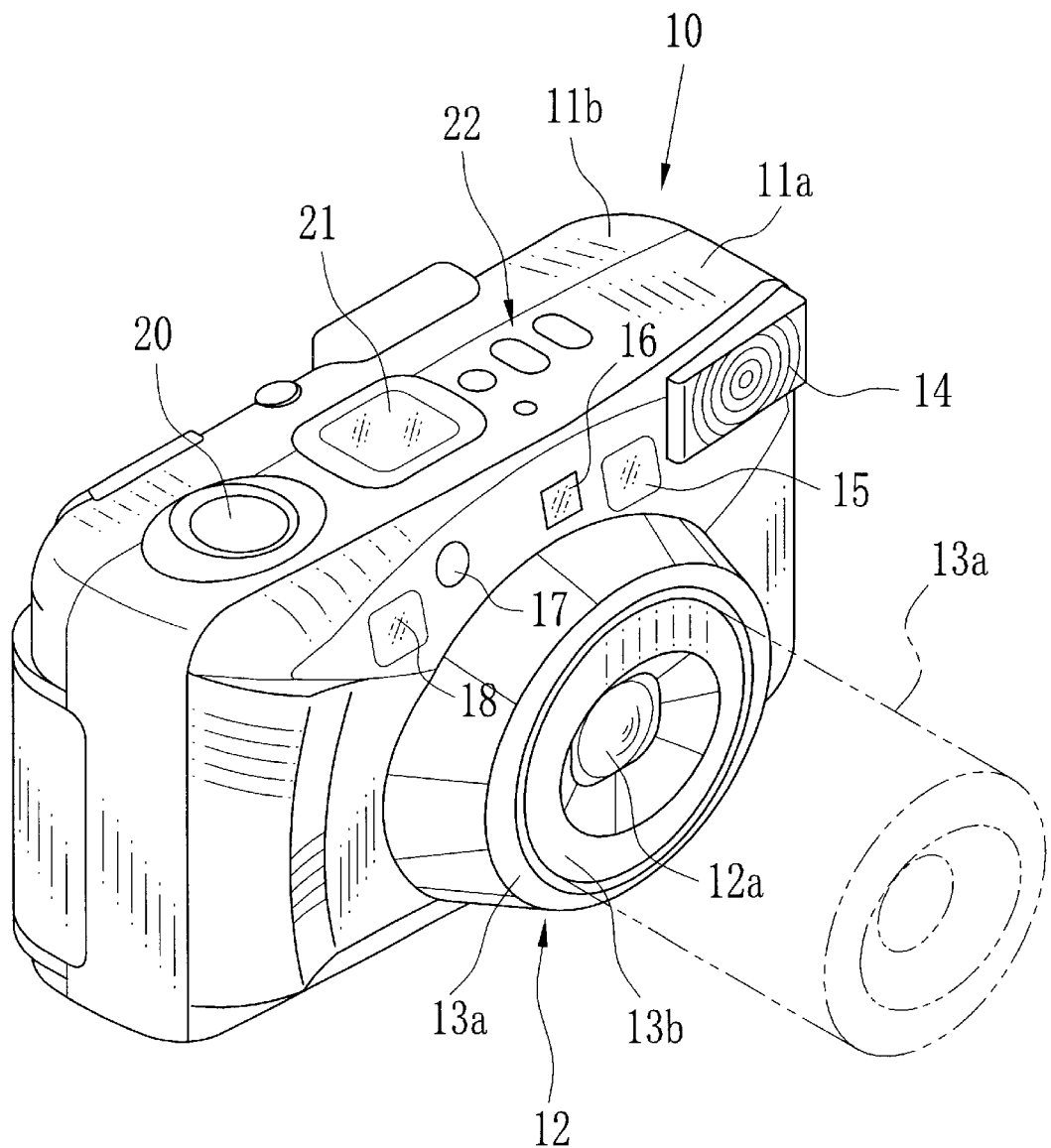
FIG. 1 is a front perspective view of a camera incorporating a zoom finder device of the present invention.
Figure 2:
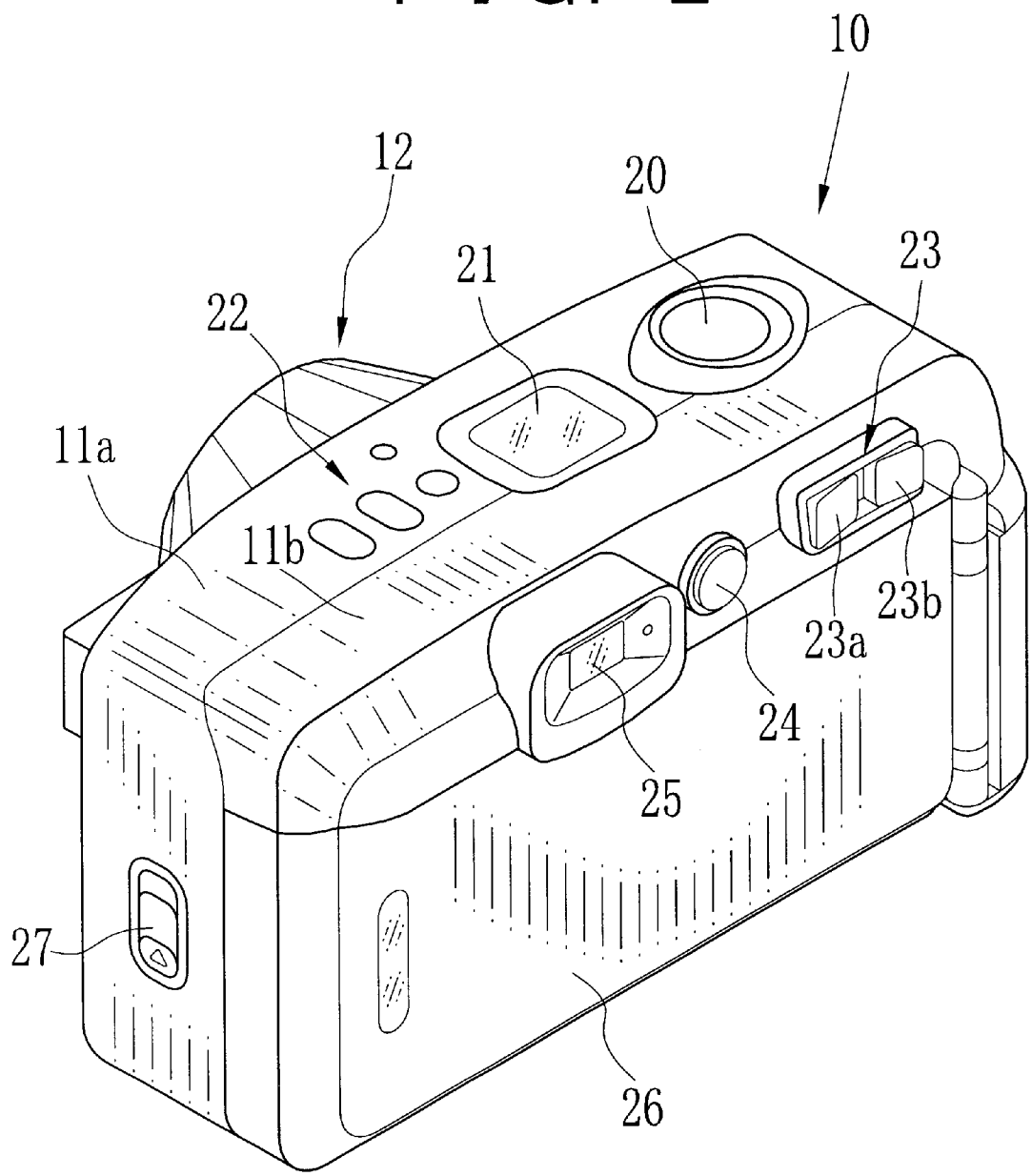
FIG. 2 is a rear perspective view of a camera shown in FIG. 1.

In FIGS. 1 and 2, a camera 10 consists of a camera body (not shown) into which several kinds of taking mechanisms are incorporated, a front cover 11a which is attached to the front of the camera body and a rear cover 11b which is attached to the rear of the camera body. There is provided with a taking lens 12, a flash window 14, an AF light emitting window 15, an objective finder window 16, an AE photometry window 17, an AF light receiving window 18 on the front of the camera 10. A shutter button 20, a LCD panel 21, a set switch 22, and so forth are disposed on the top of the camera 10. A zoom button 23, a power switch 24, an eyepiece finder window 25, a back cover 26, a knob for releasing the back cover 26, and so forth on the rear and the side of the camera 10.

The taking lens 12 consists of a fixed lens barrel 13a, a movable lens barrel 13b, and a zoom lens system 12a. The fixed lens barrel 13a is fixed to the camera body. The movable lens barrel 13b moves against the fixed lens barrel 13a and changes focal length of the zoom lens system 12a by stepwise as predetermined. There are focusing regions between two adjacent focal lengths. In the containing position the movable lens barrel 13b is retracted into the camera 10, the zoom lens system 12a becomes the maximum wide-angle and the taking magnification (focal length) becomes the minimum. In the position the movable lens barrel 13b is projected from the camera 10 as shown by two dot chain lines, the zoom lens system 12a becomes the maximum telephoto and the taking magnification becomes maximum.

The taking magnification can be selected appropriately by the zoom button 23 located at the back of the camera 10. The zoom button 23 has a W button 23a for zooming towards wide-angle end and a T button 23b for zooming towards telephoto end. On depressing the W button 23a or the T button 23b, a lens motor (not illustrated) contained in the camera 10 is driven. The driving force of the lens motor is transmitted to the movable lens barrel 13a and the zoom finder device through plural gears (not shown), actuating the zoom lens system 12a and the finder optical system. Since the taking field angle of the taking lens 12 corresponds to the visual field angle of the zoom finder device, the W button 23a or the T button 23b is kept depressing until the desired finder magnification while observing the finder visual field.

A flash projector, an AF light emitting element, the zoom finder device, an AE photo sensor, an AF light receiving element are formed at the back of the flash window 14, the AF light emitting window 15, the objective finder window 16, the AE photometry window 17, the AF light receiving window 18. The flash projector has a Fresnel lens plate on the flash window. The flash projector moves in cooperation with zooming of the taking lens 12, so as to near to or far from the Fresnel lens plate to change an illuminating angle.

The AF light emitting element and the AF light receiving element consists of a range finding section to measure distance to subject, measuring subject distance by trigonometric distance measurement. The result measured is used for auto focus control of the taking lens 12. Upon half-depressing the shutter button 20, the subject distance is measured. Upon full-depressing the shutter button 20, the taking lens 12 is focused based on the measured subject distance, and thereafter the shutter activates.

A photoelectric element is arranged on the AE photo sensor, controlling automatic exposure on the basis of the measured object brightness. When the object brightness is below the predetermined value, the flash projector emits light automatically. The available number of exposure of the photo film and other information, such as a taking mode selected by the set switch 22 and so forth are displayed.

Figure 3:
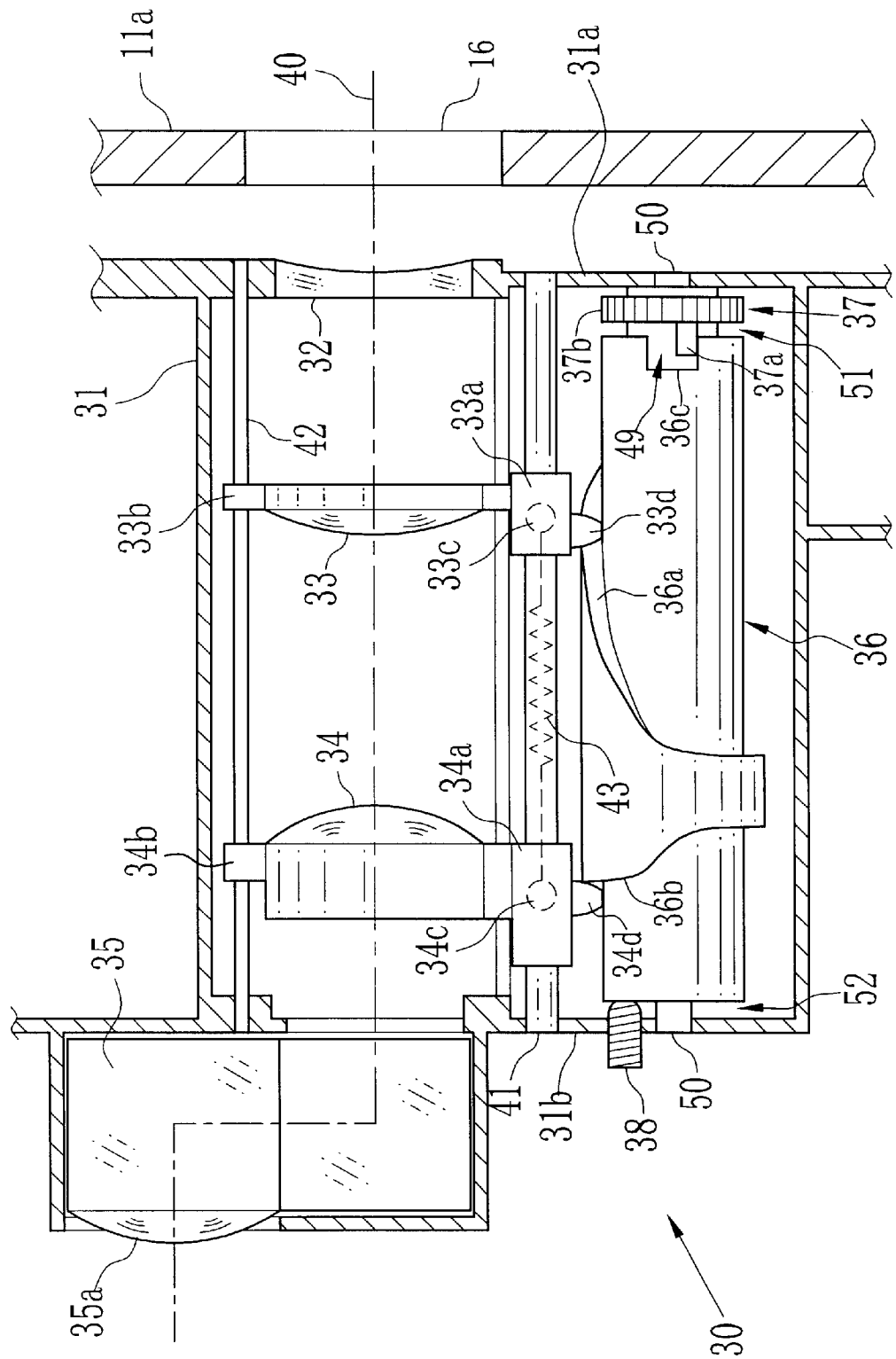
FIG. 3 is a schematic view illustrating structure of a zoom finder device.

In FIG. 3, a zoom finder device 30 consists of a unit frame 31 attached to the camera body, a finder optical system, a cam cylinder 36, a driving gear 37, an adjustment screw 38, and so forth. The finder optical system consists of an objective lens 32, a first and a second movable lenses 33, 34, an erect image prism 35, and an eyepiece lens 35a. The eyepiece lens 35a is made of plastic, integrally with the erect image prism 35. The first and second zoom lenses 33, 34 move along an optical axis 40 in cooperation with zooming of the taking lens 12, to vary the finder magnification.

The objective lens 32 is fixed by the unit frame 31. The objective finder window 16 is disposed in front of the objective lens 32, while the first and second zoom lenses 33, 34 are disposed in the rear of the objective lens 32. Guide axes 41, 42 are disposed parallel to the optical axis 40. Both ends of the guide axes 41, 42 are fixed into holes formed in a front wall 31a and a rear wall 31b of the unit frame 31. With regard to the first and second lenses 33, 34, the respective guide axes 41, 42 are inserted movable into holes (not shown) that are formed in the frame portions 33a, 34a and edge portions 33b, 34b. It is also suitable to fit the first and second zoom lenses 33, 34 into each lens holder, to insert the guide axes 41, 42 into these lens holders.

Pins 33c, 34c are respectively formed at the bottom of the frame portions 33a, 34a of the first and second zoom lenses 33, 34, and biased to an adjacent direction by a coiled spring 43 which is hung between the pins 33c, 34c. Cam follower pins 33d, 34d are formed on the side of the frame portions 33a, 34a of the first and second zoom lenses 33, 34. The cam follower pin 33d of the first zoom lens 33 is pressed to a cam surface 36a of the cam cylinder 36, while the cam follower pin 34d of the second zoom lens 34 is pressed to a cam surface 36b of the cam cylinder 36. As the cam follower pins 33d, 34d nip the cam surfaces 36a, 36b, the first and the second zoom lenses 33, 34 are controlled to move to the optical axis direction, and remove an offset between cam follower pins 33d, 34d and cam surfaces 36a, 36b.

Light entering through the objective lens 32 travels through each zoom lenses 33, 34, forming an image of a subject on a light entering surface of an erect image prism 35. The focused subject image is reversed laterally and vertically within the erect prism 36, to be confirmed as an erect image through the eyepiece lens 35a.

Figure 4:
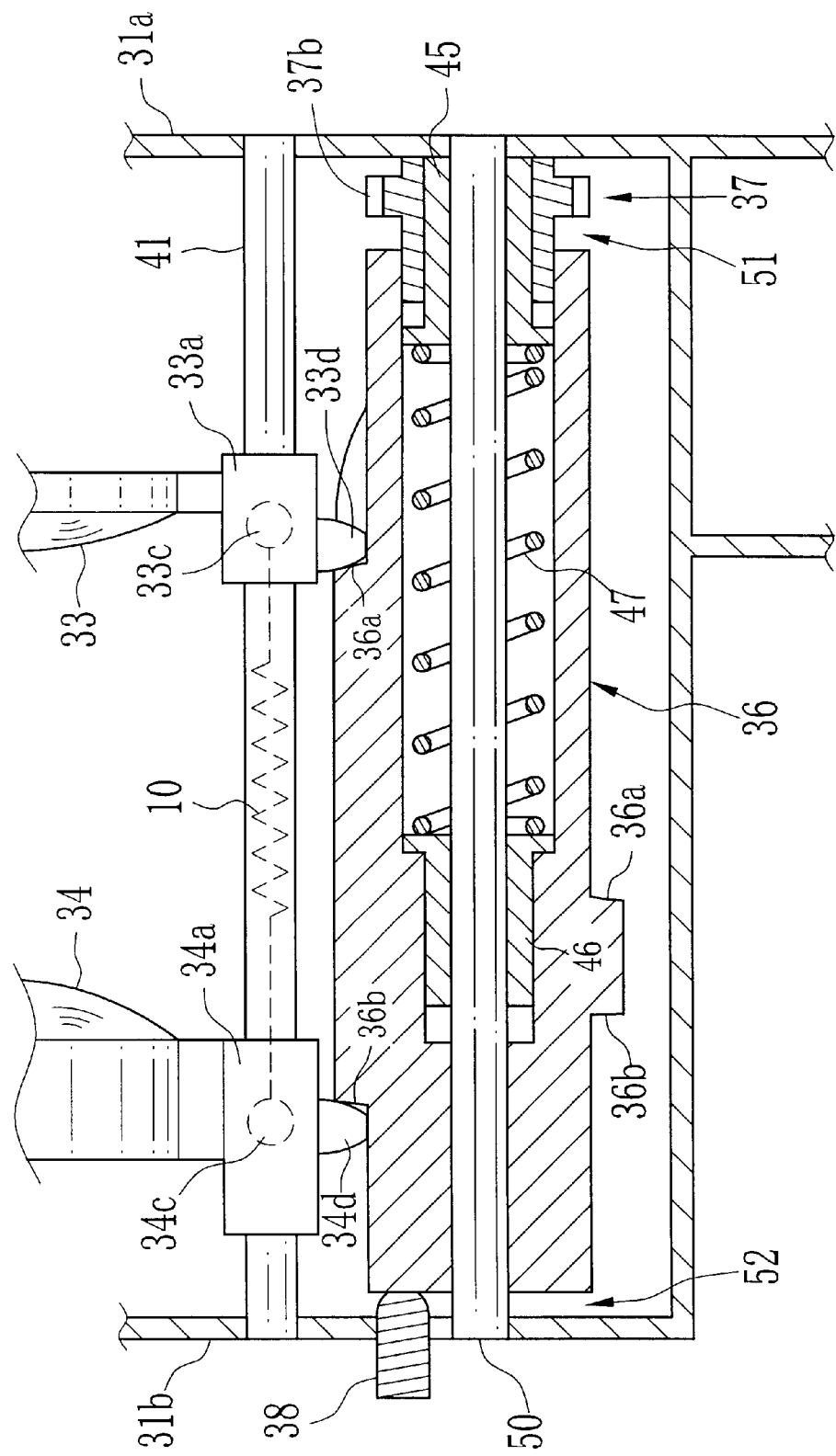
FIG. 4 is a cross sectional view illustrating an essential part of a zoom finder device illustrated in FIG. 3.

In FIG. 4, the cam cylinder 36 contains hollow structure, into which collars 45, 46, a coiled spring 47, and a driving gear 37 are put. The collars 45, 46 are fitted with the cam cylinder 36 so as to face respective large diameter portions, and between them lies the coiled spring 47. The collar 45 protrudes towards the front wall 31a side of the unit frame of the cam cylinder 36. The small diameter portion of the collar 45 is inserted through by the driving gear 37, and the small diameter portion of the driving gear 37 is fitted between the collar 45 and the cam cylinder 36.

The rotation of the driving gear 37 is transmitted to the cam cylinder 36 through transmittance mechanism. The transmittance mechanism has a predetermined idling section. When the rotational direction of the driving gear 37 is switched, the driving gear 37 rotates freely within the idle section. The driving gear 37 gets connected with the cam cylinder 36 after the free rotation, the cam cylinder 36 being rotated by the driving gear 37.

As an example, a cutout 36c and a projection 37a are used as a transmittance mechanism. The projection 37a is formed around the small diameter portion of the driving gear 37. The cutout 36c is formed at the edge of the cam cylinder 36. The projection 37a can move freely only for a gap 49 in the cutout 36c. The gap 49 becomes an idle section.

A gear 37b formed in the large diameter portion of the driving gear 37 is driven by a lens motor through plural gears. The lens motor drives the zoom lens barrel 13 through driving mechanism (not shown), to zoom the zoom lens system 12a. The cam cylinder 36, the collars 45, 46, the coiled spring 47, and the driving gear 37 are held rotatably by a supporting axis 50 that is parallel to the optical axis 40 and move to the direction parallel to the optical axis 40. The supporting axis 50 is supported by the front wall 31a and the rear wall 31b of the unit frame 31.

The coiled spring 47 urges the collars 45, 46 in a separating direction each other by its biased force. On the one hand the collar 45 gets in contact with the front wall 31a of the unit frame 31, to be locked. On the other hand the collar 46 urges the cam cylinder 36 to the rear wall 31b side. The adjustment screw 38 threaded to the rear wall 31b of the unit frame has the tip which gets in contact with the edge of the cam cylinder 36 so as not to prevent the cam cylinder 36 from rotating, regulating the cam cylinder 36 to move to the rear wall 31b side of the unit frame.

Upon threading the adjustment screw 38 into the rear wall 31b, the cam cylinder 36 moves to an axial direction against the bias of the coiled spring 47. Conversely, upon threading the adjustment screw 38 out of it, the cam cylinder 36 retracts towards the axial direction by the bias of the coiled spring 47. When the adjustment screw 38 is in a neutral position, there forms a gap 51 between the gear 37b of the driving gear 37 and the cam cylinder 36, and a gap 52 between the rear wall 31b of the unit frame and the cam cylinder 36 respectively. On rotating the adjustment screw 38, the cam cylinder 36 can move back and forth in a direction parallel to the optical axis 40 due to the gaps 51, 52.

Upon rotation of the adjustment screw 38 to move the cam cylinder 36 back and forth, each zoom lenses 33, 34 move back and forth along the optical axis 40 without changing its interval. The focusing position of the subjective light shifts back and forth. This makes the focusing position of the subjective light coincide with a focus of the eyepiece lens, setting finder visibility at a normal value.

The finder visibility is adjusted before the rear cover 11 is attached on manufacturing the camera 10. As shown in FIG. 5, it is also suitable to form a piercing hole 11c in the rear cover 11b for inserting a tool, such as a screwdriver 55 and the like, to rotate the adjustment screw 38. Similarly, it is suitable to form an operation knob that interlocks with the adjustment screw 38 outside the rear cover 11b, such that the adjustment screw is rotated through the operation knob.

In FIG. 3, the cam surfaces 36a, 36b with different angle of inclination against the direction of the rotational axis are formed around the cam cylinder 36. The cam follower pins 33d, 34d of each zoom lenses 33, 34 are in contact with the cam surfaces 36a, 36b. When the lens motor makes a rotation, the movable lens barrel 13a moves forwards or backwards through the driving mechanism, zooming the zoom lens system 12a. The rotation of the lens motor is transmitted to the driving gear 37 through plural gears. When the driving gear 37 makes a rotation, the projection 37a engages with the side of the cutout 36c, rotating the cam cylinder 36. Upon rotation of the cam cylinder 36, each cam follower pin 33d, 34d moves along the cam surfaces 36a, 36b while changing its relative position. In accordance with this, the respective zoom lenses 33, 34 also move along the optical axis 40 as changing their relative positions, such that the finder optical system conducts to zoom in cooperation with the zooming of the zoom lens system 12a.

On zooming the zoom lens system 12a toward the telephoto end, the lens motor makes a forward rotation. During the forward rotation of the lens motor, the projection 37a contacts with the bottom side of the cutout 36c, causing the cam cylinder 36 to rotate. The T button 23b is stopped operating at a desired finder magnification. Although the lens motor still keeps rotation, it stops when the taking lens 12 reaches to the next zoom step. The zoom finder device is set to a finder magnification in accordance with the next zoom step.

On zooming the zoom lens 12a to the wide-angle end, the lens motor makes a reverse rotation. The projection 37a contacts with the upper side of the cutout 36c, causing the cam cylinder 36 to rotate. The W button 23a is stopped operating at a desired finder magnification. Nevertheless, the lens motor keeps rotating and the taking lens 12 reaches a little over the next zoom step. Immediately after, the lens motor makes a forward rotation for the designated amount for absorbing backlash, bringing the taking lens back to the predetermined zoom step. While the lens motor is moving forward, the projection 37a separates from the upper side of the cutout 36c, to move to the position contacting with the bottom side. The finder magnification is unchanged during the forwarding rotation of the lens motor.

The taking lens 12 is focused by reversing rotation of the lens motor. In spite of the reverse rotation of the driving gear, the cam cylinder 36 does not rotate because the gap 49 formed between the cutout 36c and the projection 37a is appropriately set in accordance with a rotational angle of the driving gear 37 that is needed for focusing. Consequently, the finder magnification is not changed. In case the cutout 36c side separates from the projection 37a for focusing, the cam cylinder 36 does not rotates naturally. That is why the end of the cam cylinder 36 is pushed to the controlling screw 38 by the urging force of the coiled spring 47.

The above structure is explained thereafter. The visibility of the zoom finder device 30 is adjusted after attaching the zoom finder device 30 and the front cover 11a to the camera body in the camera factory. On rotating the adjustment screw 38 to move the cam cylinder 36 back and forth along the optical axis 40, the first and second zoom lenses 33, 34 move backwards and forwards towards the optical axis 40 without changing their relative positions. As a result, the focusing position of subjective light coincides with the focus point of the eyepiece lens 35a, setting the finder visibility to normal. After the finder visibility is adjusted, the rear cover 11b is attached to the camera 10, to complete the assembly. The rear cover 11b covers the adjustment screw 38.

On taking a photograph with the camera 10, a photographer looks in the eyepiece finder window 25 for framing the object, then depresses the zoom button 23 to zoom for the desired magnification. Depressing operation of the zoom button 23 drives the lens motor to rotate, forwarding or backwarding the movable lens barrel 13b through the driving mechanism, to zoom the zoom lens system 12a.

The rotation of the lens motor is also transmitted to the driving gear 37 through plural gears, to rotate the cam cylinder 36. When the cam cylinder 36 makes a rotation, the cam surfaces 35a, 36b cause the first and the second zoom lenses 33, 34 to move along the optical axis 40 through the cam follower pins 33d, 34d while changing their relative positions. In cooperation with zooming of the taking lens 12, the zoom finder device is zoomed.

Upon half-depression of the shutter button 20 after the taking lens 12 and the zoom finder device complete zooming, the subjective distance is measured by the range finding section. Upon full-depression of the shutter button 20, the lens motor is reversely rotated on the basis of the measured subjective distance, focusing by the taking lens 12. At that moment, the cam cylinder 36 does not rotate in spite of reverse rotation of the driving gear 37 because the cutout 36c of the cam cylinder 36 is formed larger than the moving distance of the projection 37a of the driving gear 37 in a crosswise direction. As a result, the finder magnification is not changed upon focusing. After focusing, the shutter is released to expose the subjective image on the film.

It is also suitable to use a cam member whose cam surface contacts with the edge portion of the cam cylinder 36 as a visibility adjustment member of the finder optical system. Besides, it is possible to combine two projections with a projection positioned between them as a transmission mechanism.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A zoom finder device for changing finder magnification of a finder optical system in cooperation with zooming of a taking lens comprising:
   a driving gear rotating in cooperation with zooming of said taking lens;
   a cam cylinder formed coaxial with said driving gear, said cam cylinder, being disposed in a direction parallel to an optical axis of said finder optical system, and movable in said parallel direction;
   a zoom lens system moving along said optical axis in accordance with a rotational amount of said cam cylinder, said zoom lens system comprising a part of said finder optical system;
   a transmission mechanism for transmitting rotation of said driving gear to said cam cylinder, said transmission mechanism permitting said cam cylinder to move to said parallel direction against said driving gear; and
   an adjustment member for adjusting a position of said cam cylinder in said parallel direction, so as to control visibility of said finder optical system.

2. A zoom finder device as claimed in claim 1 further comprising:
   a finder frame for supporting said cam cylinder rotatably; and
   a spring for urging said cam cylinder, said spring separating said cam cylinder from said driving gear so as to contact with said adjustment member.

3. A zoom finder device as claimed in claim 2 wherein said adjustment member is an adjustment screw passing through said finder frame for receiving an edge of said cam cylinder by its tip, a position of said cam cylinder being adjusted by an insertion amount of said adjustment screw.

4. A zoom finder device as claimed in claim 3 wherein said spring is a compression coiled spring, being contained in a hollow part of said cam cylinder.

5. A zoom finder device as claimed in claim 1 wherein said transmission mechanism has a predetermined idle section, said driving gear connecting with said cam cylinder after said the rotation of said driving gear only for said idling section, when switching a rotational direction of said driving gear.

6. A zoom finder device as claimed in claim 5 wherein said transmission mechanism consists of a cutout and a projection movable within said cutout, said cutout and projection being formed in said cam cylinder and said driving gear respectively.

7. A zoom finder device as claimed in claim 5 wherein said zoom lens system having at least a first and a second zoom lenses.

8. A zoom finder device as claimed in claim 7 wherein said cam cylinder has a first and a second helical cams for guiding said first and said second zoom lenses;
   said first zoom lens having a first cam follower, and said second zoom lens having a second cam follower, said first and said second cam followers holding said first and said second helical cams from both sides.

9. A zoom finder device as claimed in claim 8 further comprising a spring for urging said first and said second zoom lenses in an adjacent direction each other.

10. A zoom finder device for changing finder magnification of a finder optical system in cooperation with zooming of a taking lens comprising:
    a cam cylinder arranged in a direction in parallel to an optical axis of said finder optical system, said cam cylinder movable in said parallel direction;
    a zoom lens system moving along said optical axis in accordance with a rotational amount of said cam cylinder, said zoom lens system comprising a part of said finder optical system;
    a transmission mechanism for rotating said cam cylinder in cooperation with zooming of said taking lens, said transmission mechanism having an idle section for not transmitting rotation to said cam cylinder so as to stop said cam cylinder within said idle section when changing said zooming direction;
    an adjustment member for adjusting a position of said cam cylinder in said parallel direction so as to adjust visibility of said finder optical system.

11. A zoom finder device as claimed in claim 10 wherein said taking lens is a step zoom lens whose focal length changes stepwise.

12. A zoom finder device as claimed in claim 11 wherein said finder optical system has an objective lens, said zoom-lens system, an erect prism, and an eyepiece lens.

13. A zoom finder device as claimed in claim 12 wherein said zoom lens system has a first and a second zoom lenses and said eyepiece lens is integrated with said erect prism.

* * * * *